INVENTOR.

Hugo E. Pruss

Feb. 4, 1964 H. E. PRUSS 3,120,408
BULK-HAULING DUMP VEHICLES
Filed June 2, 1961 4 Sheets-Sheet 2
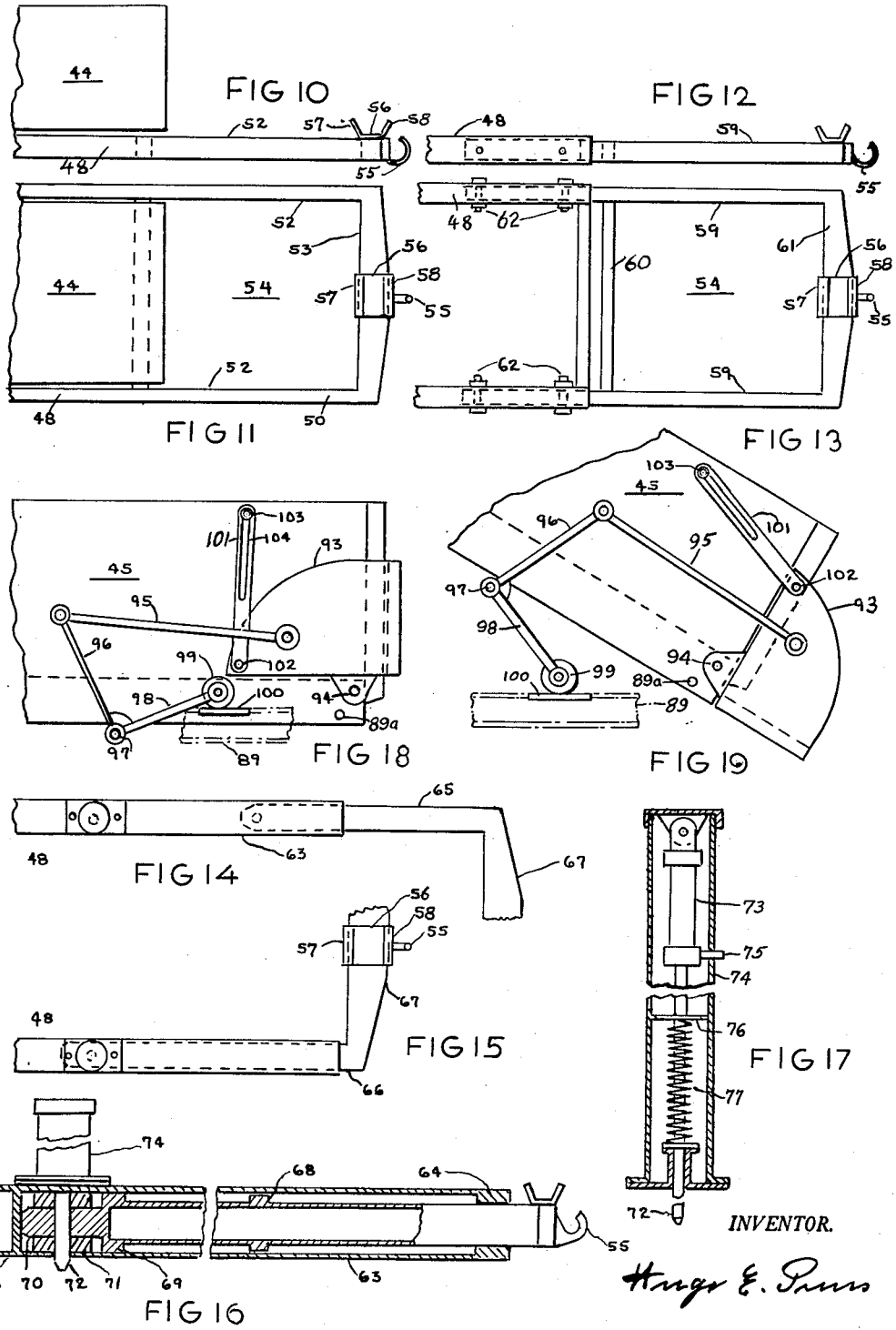
INVENTOR.
Hugo E. Pruss

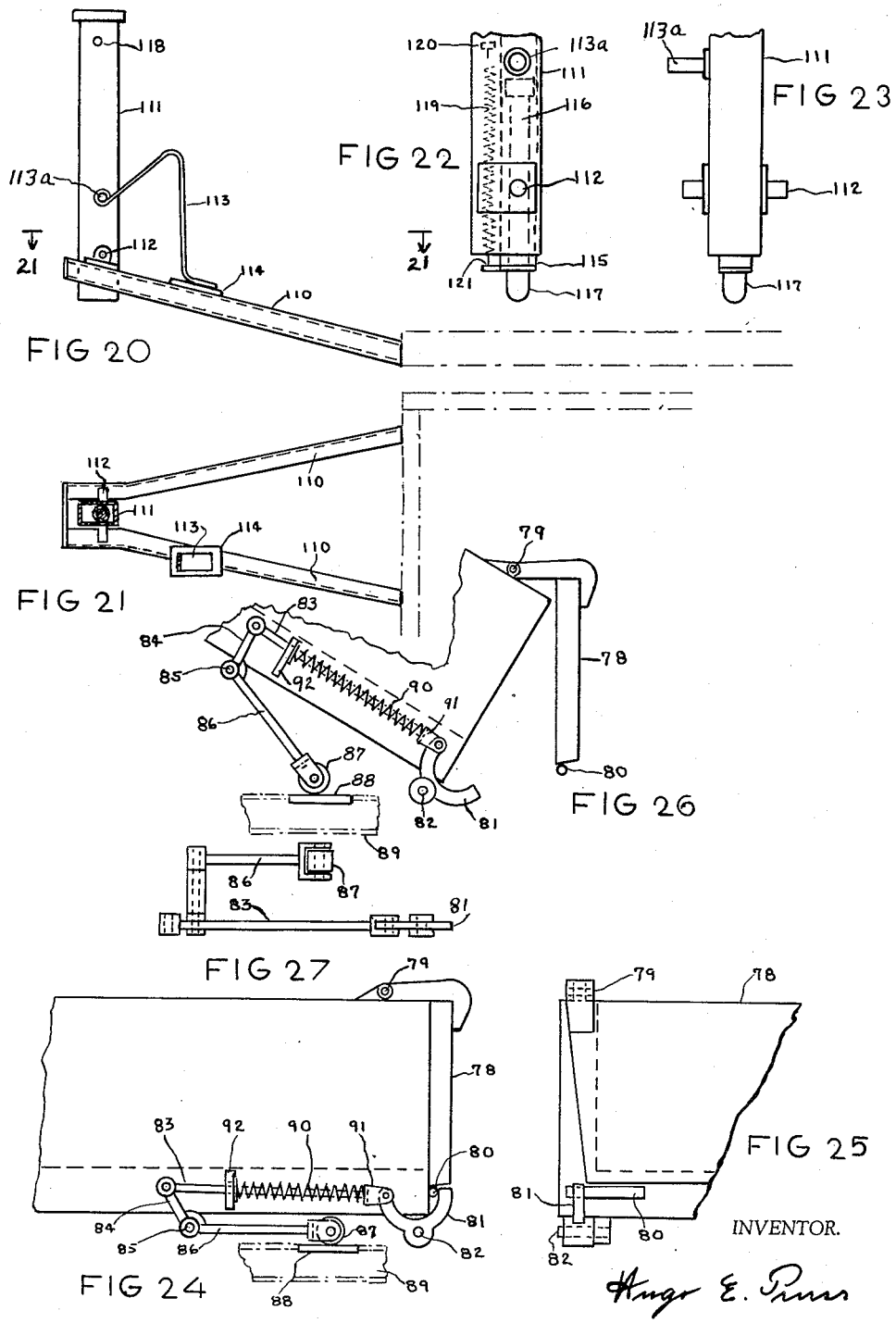

Feb. 4, 1964  H. E. PRUSS  3,120,408
BULK-HAULING DUMP VEHICLES
Filed June 2, 1961  4 Sheets-Sheet 4
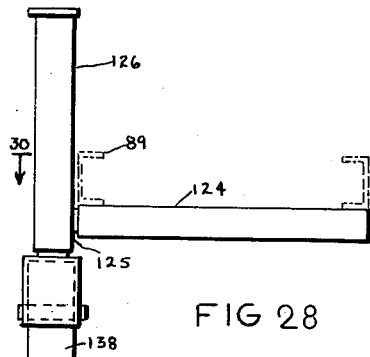
FIG 28
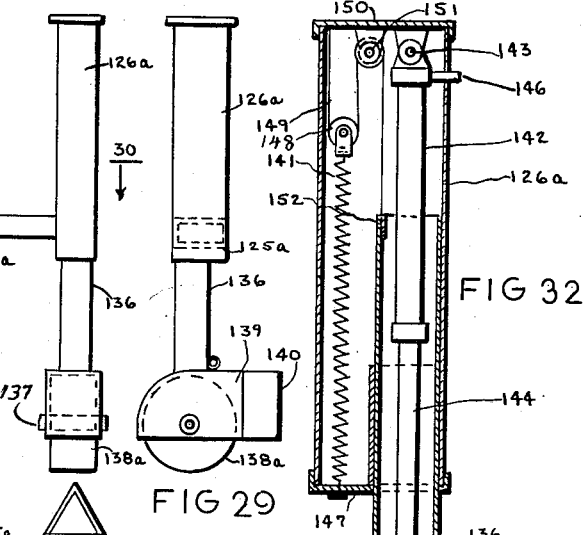
FIG 29
FIG 32
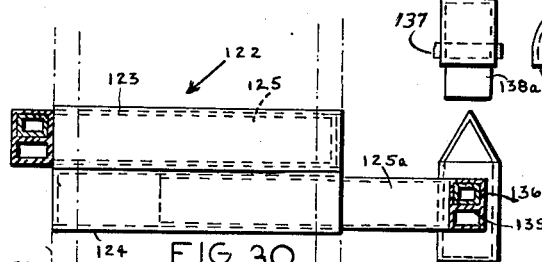
FIG 30
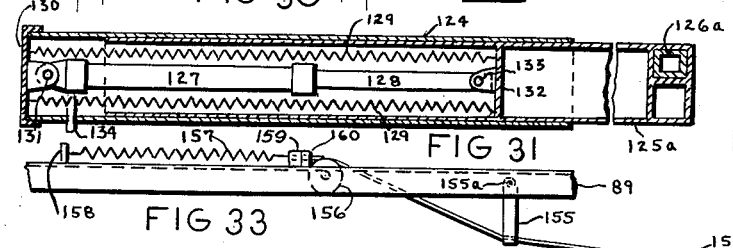
FIG 31
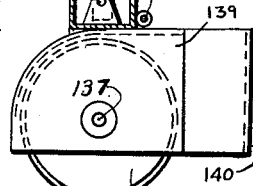
FIG 33
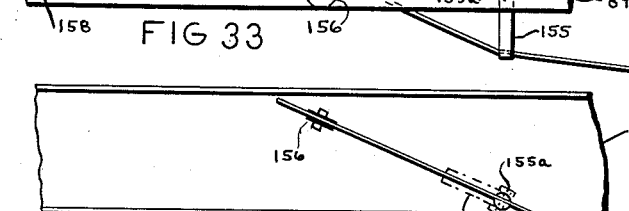
FIG 34
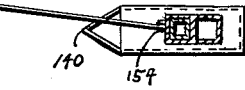
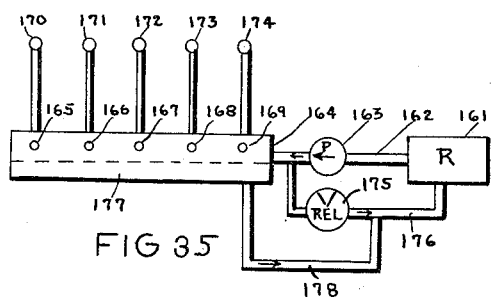
FIG 35
INVENTOR.
Huger E. Pruss

United States Patent Office 3,120,408
Patented Feb. 4, 1964

3,120,408
BULK-HAULING DUMP VEHICLES
Hugo E. Pruss, 140 Ivy Drive, Orinda, Calif., assignor of fifteen percent to Oswald H. Milmore, Piedmont, Calif.
Filed June 2, 1961, Ser. No. 127,769
21 Claims. (Cl. 298—8)

The invention relates to bulk-hauling vehicles having dumping bodies and is, more particularly, concerned with the combination of a trailer and a towing vehicle, both equipped with dumping bodies, and with the said trailer and vehicle individually when adapted for use in combination. The said towing vehicle may be an automotive tractor or a semi-trailer which can be attached to such a tractor.

The maximum load that can be carried by highway vehicles, as limited by various statutes and regulations, cannot be fully exploited by available equipment. Generally, greater loads are permitted with longer vehicles; however, a single rearwardly discharging dumping body of requisite length would render the vehicle top-heavy and subject it to the danger of being upset. On the other hand, prior attempts to overcome this difficulty by using one rearwardly or forwardly dumping body on the towing vehicle and another on a trailer (see U.S. patent to Hockensmith, Jr., No. 2,770,490) lead to difficulties in discharging the load, especially when large rocks are hauled, in that the trailer cannot be pulled forwardly over the load dumped by the forward dumping body. This has made it necessary to uncouple the trailer or to resort to inconvenient expedients for moving the load out of the way of the trailer.

It is the general object of this invention to increase the load that can be carried by dumping vehicles while avoiding the hazard of top-heaviness and the inconvenience of uncoupling the trailer during and immediately after discharge of the load while yet retaining the desirable feature of dumping the load rearwardly from the trailer and from the towing vehicle.

A particular object is to provide a trailer having a rearwardly dumping body which is equipped with auxiliary ground-engaging wheels that are normally retracted above the ground an can be extended from the trailer frame to raise said frame and at least some of the trailer running wheels off the ground, whereby the load dumped by the towing vehicle in front of the trailer can be cleared by the trailer axles and axle frame.

A further object is to provide a trailer as indicated in the preceding paragraph wherein the said auxiliary wheels can be extended laterally beyond the running wheels to engage the ground at the sides of the dumped load, the said auxiliary wheels being laterally retractable so as not to project beyond the running wheels when the trailer is operated on a highway on its running wheels.

A further object is to provide a dumping trailer having running wheels and auxiliary wheels, the latter being vertically extensible and retractable, the said trailer having at the front thereof support means engageable with a supporting element on the towing vehicle to transmit a vertical thrust to the front of the trailer and thereby permit all running wheels to be raised clear of the ground by a set of auxiliary wheels mounted on a common axis. A specific object under this general object is to provide a trailer as specified wherein the auxiliary wheels are mounted to the rear of the center of gravity of the trailer and the said support means receives upward support from the vehicle. Another specific object is to provide a trailer as specified wherein the auxiliary wheels are mounted to the front of the trailer center of gravity and the said support means receives a downward thrust from the vehicle.

Still another object is to provide a towing vehicle adapted to be attached to a dumping full trailer equipped with vertically extensible and retractable auxiliary wheels, said vehicle having a rearwardly dumping body adapted to discharge its load in front of the trailer and having a supporting element for temporarily transmitting vertical thrust to the front part of the trailer while the auxiliary wheels thereof are extended.

Still additional objects will become apparent from the following detailed description.

In summary, the towing vehicle—whether a truck or semi-trailer—has a rearwardly discharging dumping body and a rearward frame extension which provides an open space through which the load can be discharged onto the ground in front of the trailer, the rear end of said extension having coupling means for attaching a full trailer and a supporting element which is engageable by support means on the front of the trailer; in one embodiment said element affords upward support to carry the weight of the front of the trailer and in another embodiment it affords a downward support to balance the trailer about its auxiliary wheel axle.

The trailer has a reawardly discharging dumping body, running wheels, auxiliary wheels which are normally retracted above the ground but capable of being extended to beneath the level of the running wheels, and movable support means at the front which can be engaged with the said supporting element on the vehicle to stabilize the trailer in a manner to permit all running wheels to be raised above the ground without uncoupling the trailer from the vehicle. The auxiliary wheels are, according to a feature of the invention, movable laterally so that they can be retracted under the trailer frame or extended to engage the ground beyond the trackways of the running wheels and, hence, to the sides of a load dumped on the ground.

The said auxiliary wheels and support means are actuated by any suitable drive mechanism, preferably by hydraulic cylinders and pistons which are controlled from the operator's cab similarly to the controls used to tilt the dumping bodies.

The invention will be further described with reference to the accompanying drawings forming a part of this specification and showing certain preferred embodiments, wherein:

FIGURE 10 is an elevation detail view and FIGURE 11 is a plan view of the vehicle frame extension used in the embodiments of FIGURES 1–4;

FIGURES 12 and 13 correspond to FIGURES 10 and 11, respectively, and show a modification wherein the vehicle frame extension is removable from the vehicle to permit use without the trailer;

FIGURES 14 and 15 are fragmentary plan views of another modified embodiment of the vehicle frame extension which is slidable, the former view showing principally the right side in extended position and the latter principally the left side in retracted position;

FIGURE 16 is a longitudinal sectional view of the left side frame shown in FIGURE 15, drawn to an enlarged scale;

FIGURE 17 is a vertical sectional view of the pin-actuating mechanism for locking the frame of FIGURES 14—16 in retracted position and releasing it;

FIGURE 18 is a fragmentary elevation view of the trailer dumping body showing the chute plate in retracted position and illustrating the mechanism for actuating the chute;

FIGURE 19 corresponds to FIGURE 18 but shows the dumping body tilted and the chute extended;

FIGURE 20 is a side elevation of the front part of the trailer of FIGURES 1–4, showing the reciprocable support pin which constitutes the trailer support when the running wheels are raised and which is engageable with the supporting element on the towing vehicle;

FIGURE 21 is a section taken on the line 21—21 of FIGURE 20;

FIGURES 22 and 23 are, respectively, side and front elevations of the hydraulic jack housing for actuating the support pin, being different aspects to an enlarged scale of parts shown in FIGURE 20;

FIGURE 24 is a side elevation of the rear part of the dumping body in horizontal position, showing details of the dumping gate and its locking mechanism, the chute being omitted for clarity;

FIGURE 25 is a rear elevation of a part of the dumping body and gate;

FIGURE 26 is a fragmentary elevation view, corresponding to FIGURE 24 but showing the dumping body in tilted position and the dumping gate open;

FIGURE 27 is a plan view of the linkage shown in the gate-locking mechanism of FIGURE 26;

FIGURE 28 is a rear elevation of the auxiliary wheel support frame, showing the right wheel extended downwardly and the left wheel retracted upwardly, the trailer frame appearing in phantom;

FIGURE 29 is a side elevation of parts shown in FIGURE 28;

FIGURE 30 is a sectional view taken on the line 30—30 of FIGURE 28;

FIGURE 31 is a sectional view through the rear slide shown in FIGURE 30, taken on a horizontal section plane and showing the hydraulic actuating jack, drawn to an enlarged scale;

FIGURE 32 is a vertical sectional view of the parts shown in FIGURE 29, drawn to an enlarged scale;

FIGURES 33 and 34 are, respectively, fragmentary plan and elevation views of a part of the trailer showing the tensioning member on one side for stabilizing the auxiliary wheel, the wheel-support appearing in section in FIGURE 33; and FIGURE 35 is a diagrammatic view of the hydraulic system for actuating the hydraulic operating devices.

Figure 1:
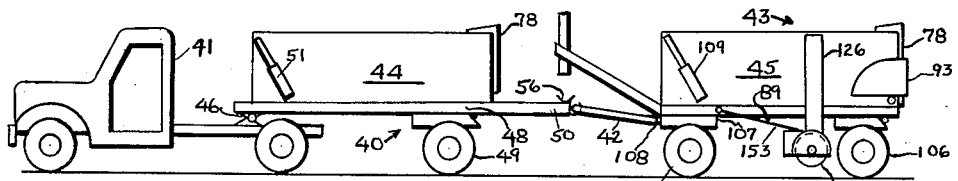
FIGURE 1 is an elevation view of a semi-trailer and full trailer combination according to the invention.

Referring to FIGURE 1, there is shown a semi-trailer 40 which is the towing vehicle and is itself propelled by a motor vehicle 41; it is connected by a drawbar 42 to a full trailer 43. The said trailers have dumping bodies 44 and 45, respectively, pivotally mounted at their rear ends to the trailer bodies. The semi-trailer is mounted on the vehicle 41 by a conventional fifth wheel 46.

Figure 4:
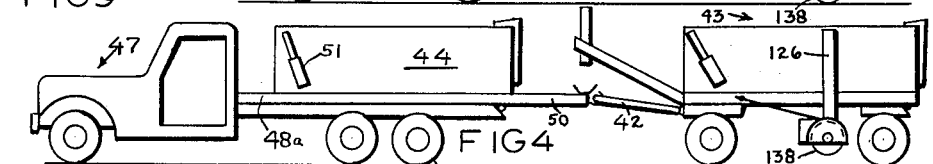
FIGURE 4 is an elevation view of an automotive truck and full trailer combination, also in accordance with the invention.

As is illustrated in FIGURE 4, the towing vehicle may be an automotive truck 47 having a dumping body 44 and similarly attached to the trailer drawbar 42.

Figures 3, 8, 9:
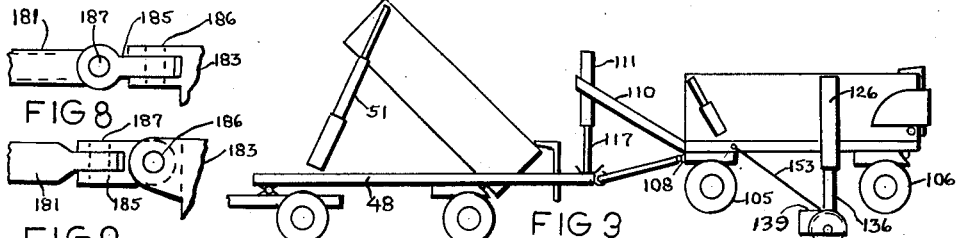
FIGURE 3 is a similar view showing a subsequent stage of the discharging operation.
FIGURE 8 is an elevation view and FIGURE 9 a plan view of the connection between the trailer of FIGURE 5 and one of the drawbars, shown to an enlarged scale.

The towing vehicle has a vehicle frame 48 or 48a, running wheels 49 or 49a, a rearward frame extension 50, and suitable power mechanism, such as a hydraulic ram 51 on each side, for tilting the dumping body by raising the front end thereof as is shown in FIGURE 3. The frame extension, shown in detail in FIGURES 10 and 11, includes side members 52 which may be integral with the vehicle frame and are joined at their rear ends by a cross member 53. The latter is spaced from the dumping body 44 to leave an open space 54 through which bulk material from the body can be discharged onto the ground. The cross member carries a coupler 55 to which the drawbar 42 can be secured, and a supporting element which includes an upwardly directed bearing or abutment plate 56 and a pair of upwardly diverging guide plates 57 and 58 which slope forwardly and rearwardly. The guide channel defined by these plates is open at the sides.

According to a modified construction of the frame extension shown in FIGURES 12 and 13, the frame extension is detachable from the vehicle frame to permit the vehicle to be used without the trailer and then occupy a shorter road space. The detachable frame includes side members 59 joined by front and rear cross members 60 and 61 which are spaced to enclose the dumping space 54, the latter cross member carrying the coupler 55 and the supporting element 56–58. The side members extend along the rear portions of the vehicle frame and are detachably secured by bolts 62.

According to another modification, shown in FIGURES 14–17, the vehicle frame extension is longitudinally slidable on the vehicle frame, which carries on each side a rigid tubular extension 63 having a thick apertured abutment wall 64 at the end. The slidable side members 65 and 66 of the frame, joined by a rigid cross member 67 which carries the coupler 55 and the supporting element 56–58, extend into the tubular extensions and have annular abutments 68 for engagement with the wall 64 to limit rearward movement to the position shown in FIGURE 14. The side members have enlarged slides 69 at their forward ends for engagement with the inside surfaces of the extensions 63. These slides and the walls of the apertures in the walls 64 restrain tilting motion of the members 65 and 66. Forwardly of these slides are locking tongues 70, each formed with a vertical hole extending therethrough for registry with a hole in a block 71 which is fixed within the tubular extension 63. When the frame extension is in its forward, retracted position shown in FIGURES 15 and 16 a locking pin 72 extends through these holes. The trailer can be towed when the frame extension is so locked.

The pin 72 is optionally provided with remotely controlled actuating means for pulling it out of the holes to release the frame extension. As shown, the pin may be attached to or be a part of a piston within a hydraulic cylinder 73 mounted within a housing 74 which is fixed to the extension 63. The cylinder has a duct 75 for admitting hydraulic fluid to raise the piston and pin. Mounted between an abutment 76 of the housing 74 and the pin is a coiled compression spring 77. This spring urges the pin downward to prevent accidental upward movement of the pin due to trepidations incident to movement over roads. When the pin 72 has been raised the towing vehicle is moved forwardly, causing the frame extension to slide rearwardly by the pull of the drawbar 42 to open a dumping space in front of the cross member 67.

The dumping bodies 44 and 45 may be of any suitable or conventional construction. Each carries a dumping gate 78 which is pivoted to the dumping body at 79, forwardly of the gate center of gravity to cause the gate to swing to closed position by gravity when the body is horizontal and to swing clear of the body when the latter is tilted. Each dumping body has suitable latching means and may be provided with a chute plate 93 to guide the bulk material during discharge. Only the latch and chute plate for the trailer body 45 are shown, those for the body 44 being similar.

Referring to FIGURES 24–27, the dumping gate 78 carries a latching bar 80. A latch 81 is pivoted at 82 on the dumping body and engages the bar when the latch is in its counter-clockwise position as viewed in FIGURE 24 and releases it when it is rotated to the clockwise position as shown in FIGURES 26 and 27. The latch has pivotal connection with the rear end of an actuating rod 83 the other end of which is pivotally connected to the short arm 84 of a bell crank which is pivoted to the dumping body by a pin 85 and the long arm 86 of which carries a roller 87. This roller engages an upwardly directed surface 88 on the trailer frame 89. The rod 83 is urged to move the latch clockwise by a coiled spring 90 surrounding it and engaging a collar 91 on the rod and an abutment 92 on the dumping body.

When the dumping body is horizontal the upward force of the frame surface 88 on the roller 87 holds the bell crank in its counter-clockwise position, shown in FIGURE 24, to hold the latch 81 in locking position. When the dumping body is tilted to the position of FIGURE 26 the bell crank can rotate clockwise; it does so by the pull of the gate, aided by the spring 90. When the dumping body is again lowered the gate, due to its forward suspension from the pivot 79, closes before the dumping body reaches its horizontal position, thereby placing the latching bar 80 into position to be engaged by the latch 81. At the end of the body movement the bell crank returns the latch fully to its latching position to secure the gate.

The dumping body may be provided at each side thereof with a chute plate or deflector 93 only one being shown. Each chute plate is pivoted to the dumping body at 94, as appears in FIGURES 18 and 19, and is normally retracted forwardly alongside of the dumping body as is shown in the former view. In these views the pivot axis of the dumping body 45 is indicated at 89a. The position of the chute plate is controlled by a rod 95 which is pivotally connected between the chute plate and an arm 96 of a bell crank which is pivoted to the dumping body at 97. The other arm 98 of the crank carries a roller 99 which engages an upwardly directed surface 100 of the trailer frame 89. The extent of rearward pivotal movement of the chute plate is limited by a slotted strap 101 which is pivoted at 102 to the chute plate and is slidable on a pin 103 which is fixed to the dumping body and extends through the slot 104 to limit the sliding movement of the strap.

The function of the chute plates is to confine the stream of bulk material discharged from the dumping body against lateral dispersion. As is evident from FIGURES 18 and 19, the bell crank is rotated to its counter-clockwise position (as viewed in FIGURE 18) to retract the chute plate when the dumping body is horizontal, but freed to move in the clockwise direction to permit the chute to move rearwardly by gravity when the body is tilted as shown in FIGURE 19.

As is shown in FIGURE 1, the frame 89 of the trailer is supported by front and rear running wheels 105 and 106. The former have their axles mounted on an axle tree or platform 107 which supports the trailer frame and is pivoted thereto on a vertical pivot, the drawbar 42 being connected to the axle tree by a horizontal pivot pin 108. An extensible hydraulic ram 109 is provided on each side between the dumping body 45 and the trailer frame to tilt the dumping body.

The trailer frame has a rigid forward extension 110 (FIGURES 20 and 21) which carries at its front extremity a vertical housing 111 pivotally mounted thereon by trunnion pins 112 for rocking motion in a vertical, longitudinal plane. The housing is urged to its vertical position by resilient means, such as a spring 113 which is fixed to a pin 113a and a support plate 114 on the extension 110 and is bent as shown to permit deflection of the spring and pivoted movement of the housing either forwardly or rearwardly from the vertical position. The housing contains a hydraulic cylinder 115 within which a piston 116 (FIGURE 22) is movable, the piston being attached to a support pin 117. Hydraulic fluid under pressure can be admitted to the cylinder through a duct 118 to force the piston and pin downward, and a spring 119 urges the pin upward for return movement when pressure on the fluid is relieved. The ends of the spring are attached to the housing and pin at 120 and 121, respectively.

The housing 111 is positioned so that, when it is in its vertical position to which it is biased by the spring 113, the axis of the pin 117 extends to the abutment plate 56. When the piston is moved downwards by hydraulic fluid the pin engages the plate 56 and raises the front end of the trailer frame to lift the front running wheels 105 off the ground, as is shown in FIGURE 3. Because the housing 111 is pivoted on its trunnions 112 it is not necessary to uncouple the drawbar 42 before raising the front end of the trailer, any change in longitudinal alignment between the pin and the supporting element 56–58 being accommodated by a tilting movement of the housing and pin axis. The angular position of the pin is determined by the guide plates 57 and 58, one or the other of which engages the pin to tilt it to the proper inclination as the drawbar assumes different inclinations during upward movement of the trailer.

The trailer has a transverse guide 122, positioned to the rear of the center of gravity of the trailer when the trailer is not loaded (FIGURES 28–32). As appears in FIGURE 30, the guide includes two juxtaposed slide housings 123 and 124, both rectangular in cross section and fixed to the trailer frame 89 in supporting relation, e.g., extending under the frame the former housing being open to the left and the latter to the right side of the trailer. Each said housing contains a slide 125 or 125a extending out from the open end of the housing and rectangular in cross section to fit the housing. The housings and slides are of sufficient lengths to provide overlap when the slides are fully extended, as is shown for the right slide 125a, so as to transmit from the slide to the housing bending moment when the weight of the trailer is supported from the outer ends of the slides. The slide 125 is shown in its retracted position. The outer end of each slide is fixed to a hollow, vertical frame 126 or 126a.

As is shown for the slide 125a in FIGURE 31, each slide has means for extending it laterally and retracting it. In the illustrative embodiment, these means include, respectively, a hydraulic cylinder 127 having a piston rod 128, and a pair of tension springs 129. The cylinder is connected to the end wall 130 of the housing by a pin 131 and the piston is fastened to a cross member 132 on the slide by a pin 133. The ends of the springs are likewise connected to the end wall 130 and cross member 132. The cylinder has a duct 134 by which hydraulic fluid under pressure can be admitted to extend the rod 128 and move the slide outward against the force of the springs. When pressure in the duct 134 is relieved the springs 129 retract and slide, causing the fluid to be expelled from the cylinder via the duct 134.

Each vertical frame 126 or 126a is compartmented by a vertical wall 135 to form a vertical guide which is rectangular in cross section and contains slidably therein a wheel-support column 136, and a chamber which contains means for moving the column vertically. The lower end of each column carries an axle 137 on which is mounted an auxiliary ground-engaging wheel 138 or 138a which is raised off the ground when the column is in raised position, as is shown for the left wheel 138 in FIGURES 1, 2, 4 and 28, but is below the level of the running wheels 105, 106, when the column is extended, as is shown in FIGURE 3 and, for the right wheel 138a, in FIGURES 28 and 29. A deflecting shield 139 preferably is provided to house the upper part of each auxiliary wheel and is forwardly tapered to a vertical edge 140 for deflecting bulk material, such as gravel, on the ground when the auxiliary wheel moves forwardly.

Each of the frames 126 and 126a contains jack means for lowering the respective column, and means for retracting the same. In the illustrative embodiment there is a tension spring 141 for raising the column and a hydraulic cylinder 142 for extending it downwards.

The cylinder 142 is fastened to the top cover plate 150 of the frame 126a by a pin 143 and its piston rod 144 is fastened to the bottom of the column by a pin 145 so as to move the column downwards when hydraulic fluid under pressure is admitted to the cylinder via a duct 146. The spring 141 has its lower end secured to the bottom wall 147 of the frame and is fastened at its upper end to the stirrup of an idler pulley 148 by which tension is applied to a cable 149. One end of the cable is fixed to the plate 150; the cable passes thence about the movable idler pulley 148 and a stationary idler pulley 151 which is fixed to the plate 150, and is secured at its other end 152 to the column 136. It is evident that the cable and pulley arrangement permits the column 136 to move vertically twice as far as the upper end of the spring, whereby a smaller variation in spring force is achieved and a shorter spring can be used. It may be noted that the spring, when contracted, supports the full weight of the column 136 and the auxiliary wheel and must, therefore, exert sufficient force to prevent accidental downward extension of the column. Further, it should not exert an excessive upward thrust on the column when fully extended downwardly, so as to avoid the need for a large cylinder or excessive fluid pressure.

The auxiliary wheels and their supporting columns 136, 136 are stabilized against rearward deflection by tensioning means which, in the illustrative embodiment, are cables. Only the cable 153 on the left side is shown, there being a similar cable on the right side. The rear end of the cable is attached to the column 136 by a connector 154 (FIGURE 32) which is situated near the auxiliary wheel. As appears in FIGURES 33 and 34, the cable extends forwardly and upwardly and, when the auxiliary wheels are laterally extended, inwardly to a folding arm 155 which is pivoted to the trailer frame on an inclined pin 155a projecting from the frame; it extends thence over an idler pulley 156 on the trailer frame to the rear end of a resilient tension spring 157 which is attached at its front to a lug 158 on the trailer frame. The front end of the cable carries a collar 159 which is situated in front of an abutment stop 160 on the trailer frame to limit rearward movement of the cable to the position shown.

It is evident that when the trailer is towed forwardly while supported on the auxiliary wheels the cables 153 prevent rearward deflection thereof, to avoid excessive stress on the columns and the slides 125, 125a. In the operative positions of the auxiliary wheels the collars 159 engage the stops 160. When the auxiliary wheels are retracted upwardly and laterally the distance from the connector 154 to the pulley 156 diminishes; the spring 157 contracts to pull the cable forward and prevent slack therein and thereby turns the arm 155 to the dotted-line position in FIGURE 34 to lie next to the trailer frame, thereby avoiding an outward projection. When the auxiliary wheels are extended downwardly and laterally the arm 155 is rotated outwardly to the position shown in solid lines by rearward cable movement.

The several hydraulic cylinders or rams 51, 109, 115, 127 and 142 are supplied with hydraulic fluid under pressure by means of suitable conduits, not shown, because they are well known per se These conduits may be individually controlled, pairs of cylinders or rams for actuating corresponding elements on opposite sides of the vehicle and trailer being normally connected to a common conduit, so that only five controls are required. (A sixth control is provided when the embodiment of FIGURES 14–17, including the cylinder 73 is used.) These conduits are individually controlled from the truck cab.

A suitable control system is shown diagrammatically in FIGURE 35, wherein 161 is a reservoir for hydraulic fluid which flows via a duct 162 and pump 163 to the high-pressure compartment 164 of a valve chest having a plurality of two-way valves (not shown) which control the passages to openings 165–169 to which the several conduits are connected. Each valve is operated by a separate lever 170–174. Excess pressure is prevented by a pressure relief valve 175 and a return duct 176. The valve chest has a low-pressure compartment 177 which is connected to the reservoir by a return duct 178. The valves have two positions, in which the passages to the openings 165–169 are connected respectively to the high-pressure and low-pressure compartments 164 and 177, the latter position being normal. When any valve is operated by its lever to connect the corresponding opening to the high-pressure compartment hydraulic fluid under pressure flows to the corresponding cylinder or ram to actuate the same; when returned to its normal position the fluid flows back into the low-pressure compartment for return to the reservoir. Because the hydraulic control system is well known and not a part of this invention, it is not further described herein.

Figure 2:
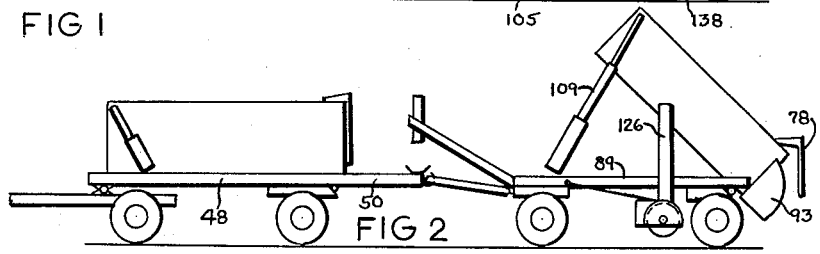
FIGURE 2 is a similar view showing the first step in discharging the load.

Operation of the vehicle-trailer combination is as follows: To dump the load carried in the two dumping bodies, the rear body 45 is first emptied by tilting it by means of its hydraulic rams 109 as is shown in FIGURES 2, 19 and 26. Tilting of the body unlatches the dumping gate 78 and permits the chutes 93 to be extended rearwardly. When the trailer load has been discharged the body 45 is returned to its horizontal position, thereby closing the gate 78 and latching it and retracting the chutes 93. The auxiliary wheels are spread laterally by admitting fluid to the slide cylinders 127, thereby extending the slides 125, 125a, and the columns 136 to position said wheels outwardly from the running wheels. The columns are thereafter extended downwards by admitting fluid to the cylinders 142, causing the auxiliary wheels to engage the ground and raise the trailer frame. The rear running wheels 106 are thereby lifted off the ground. Fluid is also admitted to the cylinder 115—either during or after the lowering of the auxiliary wheels—to extend the support pin 117 downwards into engagement with the supporting element 56–58 to raise the front end of the trailer and lift the front running wheels 105 off the ground. During this action the housing 111 may rock on its trunnion pins 112 to accommodate the small change in distance between the towing vehicle and the trailer as the inclination of the drawbar 42 changes. The resulting position is shown in FIGURE 3; the trailer is supported entirely by the auxiliary wheels and by the towing vehicle via the pin 117. Because the auxiliary wheels are located only a short distance to the rear of the trailer center of gravity they carry most of the weight and only a small load is placed on the frame extension of the towing vehicle.

The dumping body 44 on the towing vehicle is then tilted to discharge its load rearwards through the dumping space 54 in the frame extension, in front of the trailer. It will be understood that the vehicle and trailer may be moved either forwards or backwards before or during discharge from the body 45, and that the latter body may be emptied before the trailer is raised as was described in the preceding paragraph. The forward body 44 is returned to horizontal position when empty. The vehicle and trailer are then moved forwardly to clear the dumped load. During this movement the auxiliary wheels roll on the ground to the sides of the bulk material dumped from the body 44 (and from the body 45 if it was moved backwards prior to dumping from the body 44) and the running wheels 105 and 106 pass above the dumped material. Occasional bulk material encountered by the auxiliary wheels is pushed aside by the deflecting shields 139.

When the trailer has been pulled past the dumped load its frame is lowered to bring its running wheels to the ground by relieving fluid pressure from the cylinders 115 and 142. After the weight is carried by the running wheels the springs 119 and 141 further retract the pin 117 and the columns 136 to the travelling position shown in FIGURE 1. The auxiliary wheels are then retracted laterally by relieving fluid pressure from the slide cylinders 127 to permit the springs 129 to pull the slides 125 and 125a inward.

The foregoing description applies also to the embodiment of FIGURES 12–13. However, there are certain differences in operation to be noted when the slidable rear frame extension of FIGURES 14–17 is used. The trailer is normally towed over roads with this frame in its forward, retracted position, shown in FIGURES 15 and 16, locked by the pins 72. Prior to tilting the front body 44—either before or after the trailer load has been dumped—the pins 72 are raised by admitting fluid to the cylinder 73 and the towing vehicle is moved forwards a short distance; the pull of the drawbar on the coupler 55 causes the frame extension to slide to its rear position, shown in FIGURE 14, with the abutments 68 in engagement with the walls 64. This provides an open space in front of the cross member 67 and trailer through which the load from the body 44 can be discharged. The other operations are as previously described. When the trailer is again in travelling condition the frame extension is returned to retracted position and secured by the pins 72.

In the embodiments described above the front part of the trailer was given upward support from the towing vehicle. In the embodiment shown in FIGURES 5–9 the trailer 43a has the auxiliary wheels 138 and their supporting structure situated slightly to the front of the trailer center of gravity so that the trailer tends to tilt up at the front and the towing vehicle gives a downward support thereto. With the exception of the drawbar and support connection between the towing vehicle and trailer, all parts of this embodiment are the same as those previously described, and like reference numbers denote like parts.

Figure 5:
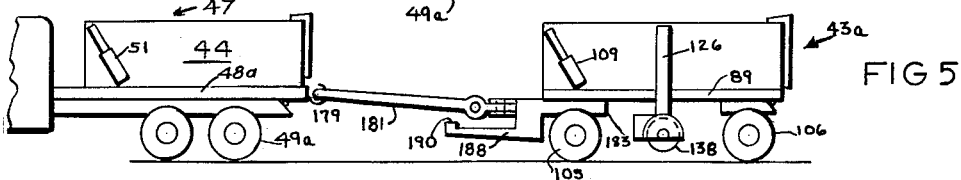
FIGURE 5 is an elevation view of an automotive truck and full trailer combination showing a modified construction of the drawbar, location of the auxiliary wheel axle, and support means at the front of the trailer.
Figure 6:
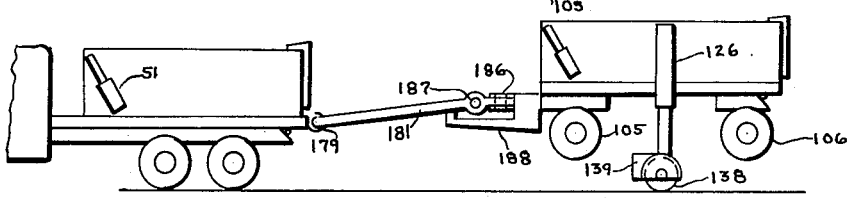
FIGURE 6 is a similar view showing the trailer of FIGURE 5 elevated by its auxiliary wheels and stabilized by the drawbar.
Figure 7:
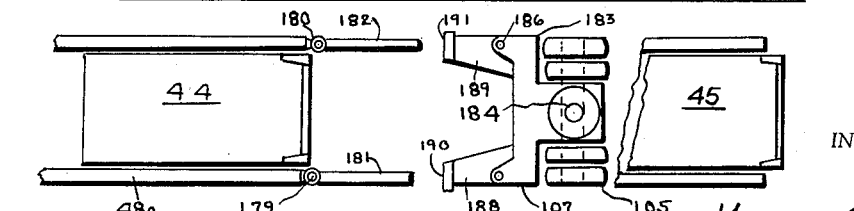
FIGURE 7 is a plan view of FIGURE 5, some parts being broken away for clarity.

The towing vehicle is a motor truck 47 carrying a pair of couplers 179, 180 respectively on the left and right sides of its frame 48a. Although these couplers are shown diagrammatically, it will be understood that they are of the type which can transmit downward thrust from the truck frame to the drawbars 181, 182 and permit vertical and horizontal pivotal movement of these bars. The drawbars are connected with double pivots to the sides of the axle tree 183 of the trailer 43a which is supported by the axle tree and is pivoted thereto on a vertical axis 184. As is shown in detail in FIGURES 8 and 9, each side of the axle tree 183 carries a short, forwardly extending link 185 which is pivoted on a vertical pin 186 and is rotatable only in a horizontal plane. The front end of each link carries a horizontal pin 187 to which the rear end of the drawbar 181 or 182 is pivoted. The axle tree has two rigid forward extensions 188, 189, spaced below the links 185 and terminating in horizontally extended, upwardly directed abutments 190, 191. These abutments are spaced below the drawbars when the trailer is on its running wheels 105, 106, as shown in FIGURE 5. However, they limit downward pivotal movements of the drawbar by engagement therewith at points sufficiently forward of the pins 187 to avoid excessive stress on the links, as is shown in FIGURE 6.

In operation, with the truck and trailer initially in travelling position as shown in FIGURE 5, the trailer load is discharged and the auxiliary wheels are extended laterally and downwardly as was described for the previous embodiments. When the trailer is raised on its auxiliary wheels its tilting movement is checked by engagement of the abutments 190, 191 with the drawbars, as is shown in FIGURE 6. The truck-trailer combination can then be moved as was described above to clear the dumped load. The trailer is thereafter returned to travelling position. These operations differ from those heretofore described only in that there is no support pin at the front of the trailer, thereby eliminating one hydraulic cylinder and the control therefor. The drawbars 181, 182, being spaced apart, provide an intervening space through which the load from the truck body 44 can be discharged.

It is evident that by the constructions according to this invention it is possible to discharge loads from dumping bodies on both the towing vehicle and trailer toward the rear and that the two loads can be discharged over a relatively confined area or spread out, as desired. These capabilities make it practicable to haul bulk material in two dumping bodies to locations which could not be reached with prior constructions using dual dumping bodies, thereby making is possible to use a greater overall length or wheel-base and haul larger pay-loads.

I claim as my invention:

1. A bulk-hauling and dumping trailer adapted to be pulled by a road vehicle, comprising: a trailer frame; ground-engaging running wheels mounted on said frame; a dumping body mounted for tilting motion on said frame; a dump gate normally closing the discharge end of the dumping body; means for tilting the dumping body; auxiliary ground-engaging wheels; and an auxiliary frame interconnecting said trailer frame and said auxiliary wheels, said frame including jack means for selectively retracting said auxiliary wheels above the ground and extending them beneath the level of the running wheels thereby to raise the trailer frame and lift at least some of said running wheels off the ground.

2. A trailer as defined in claim 1 wherein said jack means includes a hydraulic cylinder and piston connected to extend said auxiliary wheels downwards from the frame when the piston is actuated; means for admitting fluid under pressure to said cylinder to actuate the piston; and resilient means for raising the auxiliary wheels when pressure on said fluid is relieved.

3. In combination with the trailer defined in claim 1, a tension member connected at its rear end to said auxiliary frame near the auxiliary wheels and extending forwardly; and resilient means interconnecting the front end of said tension member to the trailer frame.

4. In combination with the trailer as defined in claim 3, abutment means on said tension member and trailer frame for limiting rearward movement of the tension member.

5. The combination defined in claim 1 wherein said auxiliary frame includes means for positioning the auxiliary wheels selectively at inner positions within the lateral limits of said running wheels and outer positions beyond said limits, and power means for moving said wheels between said positions, whereby said auxiliary wheels, when extended downwardly, engage the ground to the sides of bulk material dumped on the ground within the trackways of said running wheels.

6. A trailer as defined in claim 1 wherein said auxiliary wheels are longitudinally offset from the trailer center of gravity when extended downwardly, whereby said trailer tends to tilt about said wheels, said trailer comprising, further, support means at the front end thereof adapted to receive vertical thrust from a road vehicle to which said trailer is attached for stabilizing the trailer against said last-mentioned tilting.

7. A trailer as defined in claim 6 wherein said auxiliary wheels are offset to the rear of the trailer center of gravity and said support means is engageable with a supporting element on said road vehicle to transmit upward thrust to the trailer; and jack means for raising the front end of the trailer relatively to said road vehicle through said support means and supporting element.

8. The combination defined in claim 7 wherein said support means includes a support member mounted for up and down motion relatively to the trailer frame, said jack means including a hydraulic cylinder and piston connected to move said support member down against said supporting element to raise the front end of the trailer.

9. The combination defined in claim 6 wherein said auxiliary wheels are offset to the front of the trailer center of gravity and said support means includes a drawbar extending forwardly from the trailer and pivoted for vertical movement, and abutment means on the trailer frame positioned beneath the drawbar to limit downward pivotal movement thereof for depressing the front end of the trailer when the front end of the drawbar is held down by said road vehicle.

10. A bulk-hauling and dumping full trailer adapted to be pulled by a road vehicle, comprising: a trailer frame; front and rear running wheels mounted on said frame; a dumping body pivotally mounted on said frame; means for tilting said body; a pair of auxiliary ground-engaging wheels; and a connection between said trailer frame and said auxiliary wheels, said connection including a transverse slide guide mounted on said frame, a pair of slides movable laterally on said guide, and vertically extensible means for each of said slides each interconnecting one slide and one auxiliary wheel for retracting said auxiliary wheels above the ground level and extending said auxiliary wheels beneath the level of the running wheels and thereby raising the trailer frame and lifting the running wheels off the ground, said slides being movable outwards to position said auxiliary wheels laterally beyond the running wheels and inwards to position the auxiliary wheels within the limits of the running wheels.

11. In combination with the trailer defined in claim 10, hydraulic cylinders and pistons connected to said slides for moving said slides outwards and means for moving them inwards; and hydraulic cylinders and pistons connected to said vertically extensible means and to the slides for extending the last-mentioned means, and means for contracting said vertically extensible means to retract the auxiliary wheels upwards.

12. A trailer as defined in claim 10 wherein said vertically extensible means comprises, for each said slide: a vertical guide rigidly attached to the outer end of the slide; a column vertically movable on said guide having an auxiliary wheel fixed by an axle to the bottom thereof; a hydraulic cylinder and piston interconnected between said guide and column for extending the column downward; and resilient means for moving the column upwards.

13. A bulk-hauling and dumping road vehicle adapted to pull a bulk-hauling and dumping trailer and to support the front end of said trailer, said vehicle comprising: a vehicle frame having running wheels and, at the rear end thereof, a rearward frame extension which includes side members which are laterally spaced by a distance substantially equal to the width of the vehicle frame and a connection between said side members spaced rearwardly from said vehicle frame coupling means at the rear of said frame extension for attaching the drawbar of said trailer; a supporting element on said frame extension for engagement by support means on the front of said trailer; a dumping body pivotally mounted on said vehicle frame and situated forwardly of said frame extension for dumping its load rearwardly between said side members and forwardly of said connection; a dump gate normally closing the rear end of said body; and means for tilting said body.

14. A bulk-hauling and dumping vehicle adapted to pull a trailer and to support at least a part of the trailer, said vehicle comprising: a vehicle frame having at least four running wheels for independent stability and, at the rear end of said frame, a rearward frame extension which includes side members extending rearwardly from the vehicle frame and rigidly mounted thereon, said side members being spaced apart laterally by a distance substantially equal to the width of said vehicle frame; coupling means on a rear part of said frame extension which is spaced a fixed distance behind said frame for attaching a front part of a trailer for vertical support and vertical articulation; a dumping body pivotally mounted on said vehicle frame for rearward dumping of a bulk load through the space between said side members and forwardly of said coupling means and the trailer attached thereto; a dump gate normally closing the rear end of said body; and means for tilting said body upwardly.

15. A bulk-hauling vehicle as defined in claim 14 wherein said frame extension is slidable longitudinally with respect to the vehicle frame, said vehicle frame including means for locking the frame extension in the forward, retracted position thereof and means limiting the rearward extension thereof.

16. In combination with the vehicle as defined in claim 15 remotely controllable means for unlocking the frame extension from the retracted position thereof.

17. The combination of a vehicle and a full trailer for bulk-hauling on and dumping from both while united, comprising: a road vehicle including a vehicle frame, vehicular running wheels on said frame, a dumping body pivotally mounted on said frame for dumping its load rearwardly and having a dump gate normally closing the rear end thereof, and means for tilting said dumping body; and a full trailer at the rear of said vehicle including a trailer frame, front and rear trailer running wheels on the trailer frame, a dumping body mounted pivotally on the trailer frame on a transverse axis for dumping its load longitudinally and having a dump gate normally closing the discharge end thereof, means for tilting the trailer dumping body, auxiliary ground-engaging wheels mounted movably on said trailer frame for retraction above the ground and extension to below the level of the trailer running wheels, means for retracting and extending said auxiliary wheels, and means interconnecting the trailer and vehicle frames including a drawbar and support means for transmitting vertical thrust between the vehicle frame and the front part of the trailer and for stabilizing the latter against tilting when said auxiliary wheels are extended.

18. The combination as defined in claim 17 wherein said auxiliary wheels are situated to be in rear of the trailer center of gravity when extended, said support means including a jack for raising the front end of the trailer and acting between the trailer and vehicle frames.

19. The combination as defined in claim 17 wherein said means interconnecting the trailer and vehicle frames includes a rearward frame extension on the vehicle frame having side members which are spaced laterally to provide an open space between them through which the load of the vehicle dumping body can be discharged.

20. The combination as defined in claim 17 wherein said auxiliary wheels are situated to be in front of the trailer center of gravity when extended, said drawbar being mounted on the trailer for vertical pivotal movement thereon, and said support means includes abutment means on the trailer limiting downward pivotal movement of the drawbar for imparting a downward thrust to the front part of the trailer.

21. The combination as defined in claim 17 wherein said auxiliary wheels are mounted for lateral movement relatively to the trailer between positions within and beyond the lateral limits of the running wheels, whereby said auxiliary wheels, when extended laterally and downwardly, engage the ground to the sides of bulk material dumped on the ground within the trackways of the trailer running wheels.

References Cited in the file of this patent

UNITED STATES PATENTS

| | | |
|---|---|---|
| 537,165 | Mandt | Apr. 9, 1895 |
| 2,201,148 | Berger | May 21, 1940 |
| 2,246,128 | Fairbanks | June 17, 1941 |
| 2,304,622 | Barrett | Dec. 8, 1942 |
| 2,469,199 | Lewis | May 3, 1949 |

FOREIGN PATENTS

| | | |
|---|---|---|
| 151,027 | Germany | May 9, 1904 |
| 645,711 | Great Britain | Nov. 8, 1950 |